United States Patent

[11] 3,622,816

[72] Inventor George M. McGrew
Kansas City, Mo.
[21] Appl. No. 45,658
[22] Filed June 12, 1970
[45] Patented Nov. 23, 1971
[73] Assignee Electro Dynamics Corporation
Shawnee Mission, Kans.

[54] PIEZOELECTRIC CRYSTAL ASSEMBLY
6 Claims, 5 Drawing Figs.

[52] U.S. Cl. .... 310/9.4, 310/8.9, 310/9.5
[51] Int. Cl. .... H01v 7/00
[50] Field of Search .... 310/8.9, 9.1, 9.5, 9.4, 8.2

[56] References Cited

UNITED STATES PATENTS

| | | | |
|---|---|---|---|
| 2,488,781 | 11/1949 | Reeves | 310/9.4 X |
| 3,348,078 | 10/1967 | Nagata et al. | 310/9.1 X |
| 3,299,301 | 1/1967 | Heilmann et al. | 310/9.1 |
| 2,464,046 | 3/1949 | Kuenstler | 310/9.4 |
| 2,817,778 | 12/1957 | Shepherd | 310/9.4 |
| 2,595,037 | 4/1952 | Wolfskill | 310/9.4 |
| 2,386,692 | 10/1945 | Kuenstler | 310/9.4 X |
| 2,453,435 | 11/1948 | Havstad | 310/9.1 X |

*Primary Examiner*—J. D. Miller
*Assistant Examiner*—Mark O. Budd
*Attorney*—Schmidt, Johnson, Hovey and Williams ABSTRACT: An improved piezoelectric crystal assembly, for minimizing the space required by and the cost of manufacturing piezoelectric units employing circular disc-type crystal elements having plated or otherwise deposited electride and contact structures thereon, is provided by housing the crystal element within an annular insulting frame having a cupped conductive member fitted upon each open end thereof, with each such member having a series of integral tabs angularly extending toward the other member for holding the crystal element within the frame and effecting electrical connection with the contact structures thereon. Openings are provided in each member to permit frequency adustment after assembly by the technique of depositing further electrode material upon the element, the assembly being closed and sealed after such adjustment by affixing covers over said openings and encapsulating the assembly in potting material.

INVENTOR.
George M. McGrew
BY
Schmidt, Johnson, Hovey, Williams & Chase.
ATTORNEYS.

PIEZOELECTRIC CRYSTAL ASSEMBLY

This invention relates generally to the field of piezoelectric devices such as are commonly employed in radio, television and other electronic equipment for frequency control purposes. More specifically, the invention is concerned with providing improved means for housing, holding and effecting electrical coupling with the electrode structures on those types of piezoelectric crystal elements having electrode layers permanently affixed thereto.

One type of such piezoelectric crystal element in wide usage employs a relatively small, circular, disclike element of quartz or other piezoelectric material with a metallic, electrically conductive electrode structure plated, sputtered or otherwise deposited upon and adhered to a central portion of each of the opposed faces of the element, with a contact structure of similar material and similarly affixed to the element extending from each electrode structure toward the periphery of the element. Due to both operational considerations and considerations of economy, such contact structures leading from the electrode structures on such crystal elements are striplike in character and normally of lesser width than the greatest dimension of the corresponding electrode structure, so that each contact structure extends over only a minor portion of the marginal part of each face of the element. With such piezoelectric elements, it is preferred that electrical coupling to the electrode structures be accomplished through contact with the corresponding contact structure, so as to avoid undesirable mechanical damping of the central portion of the crystal element which is most active and critical in determining the piezoelectric characteristics of the overall device when operated for frequency control purposes. For the same reason, it has been found desirable to hold such piezoelectric crystal elements by means that avoid mechanical damping of the central portion of the faces of the element. It has heretofore been customary to extend the contact structures on the opposite faces of the element in opposite directions and to mount such elements between clips formed by bending in the ends of a pair of electrically conductive rods, with the clip of each rod engaging a marginal part of the element to mechanically support the latter and to effect such engagement at positions on the element such that the clips will effect electrical contact with the contact structure extension on each face of the element. This has required exact orientation of the element relative to the clips and, because of the size and fragility of the elements, has greatly increased the cost of producing piezoelectric devices by requiring relatively skilled labor to perform the exacting task of manually emplacing and properly orienting the elements within the holding clips.

Such prior devices, because of the nature of the means used for holding and effecting electrical coupling with the element, have conventionally involved the mounting of the crystal-supporting rods in an insulative baseplate and the fitting onto the latter of a metallic, caplike housing, which must then be hermetically sealed to the baseplate to prevent the entry of moisture and impurities into the area occupied by the crystal element. Such structural elements and assembly steps required with the types of crystal housing and holding devices heretofore employed have not only compounded the costs of manufacture of such devices, but have resulted in completed devices which occupy an inordinate amount of space or volume in relationship to the size of the crystal element being accommodated.

The cost of manufacture of such conventional devices has also been significantly further increased by the necessity of having to make final frequency adjustments on the units once the effective frequency characteristics of the crystal element assembled in its housing have been determined by testing. Such frequency adjustments are normally made by depositing or affixing a relatively small amount of additional electrode material upon the electrode structures initially provided on the crystal element. Because of the effects upon the operational frequency characteristics of the crystal element of adjacent metallic structure used for mounting and housing purposes, the final frequency adjustments cannot accurately be made without testing the device in its fully assembled condition. As those skilled in the art are well aware, this necessitates the sometimes repetitive assembly and disassembly of conventional crystal devices in order to accomplish the successive depositing of further material upon the crystal element to bring its operating characteristics into the desired frequency tolerances.

It is the primary object of this invention to overcome the aforementioned disadvantages of prior types of piezoelectric crystal assemblies by providing an improved type of assembly eliminating the costly and time-consuming manual assembly steps heretofore required.

It is another important object of this invention to provide such an improved piezoelectric crystal assembly which permits final adjustments of the operating frequency characteristics of the crystal element to be made by known and conventional techniques but without the necessity for disassembling the crystal element from its associated metallic housing structures.

A further object of this invention is to provide an improved piezoelectric crystal assembly employing a minimum number of parts and which occupies a minimum volume or space in relation to the size of the crystal element itself.

Still other important objects of the invention will be made clear or become apparent to those skilled in the art from the drawing and the description that follows concerning an illustrative preferred embodiment of the invention. In the drawing.

A preferred embodiment of the invention will be described in relation to a circular disclike type of piezoelectric element, although it should be understood that the invention is adapted for application with crystal elements of other shapes, although it has particular additional advantages with crystals of shapes that would require special orientation relative to the means provided for holding them and effecting electrical coupling with them, as is now conventionally required in prior devices.

The completed assembly or device is generally designated by the numeral 10 and includes a covering and sealing layer 12 of any suitable potting material, such as are well known and in wide usage for covering and protecting electrical components, and a pair of electrically conductive wire leads 14 and 16, which protrude from the covering layer 12 for coupling the assembly 10 with an external electrical circuit.

Figures 2, 5:
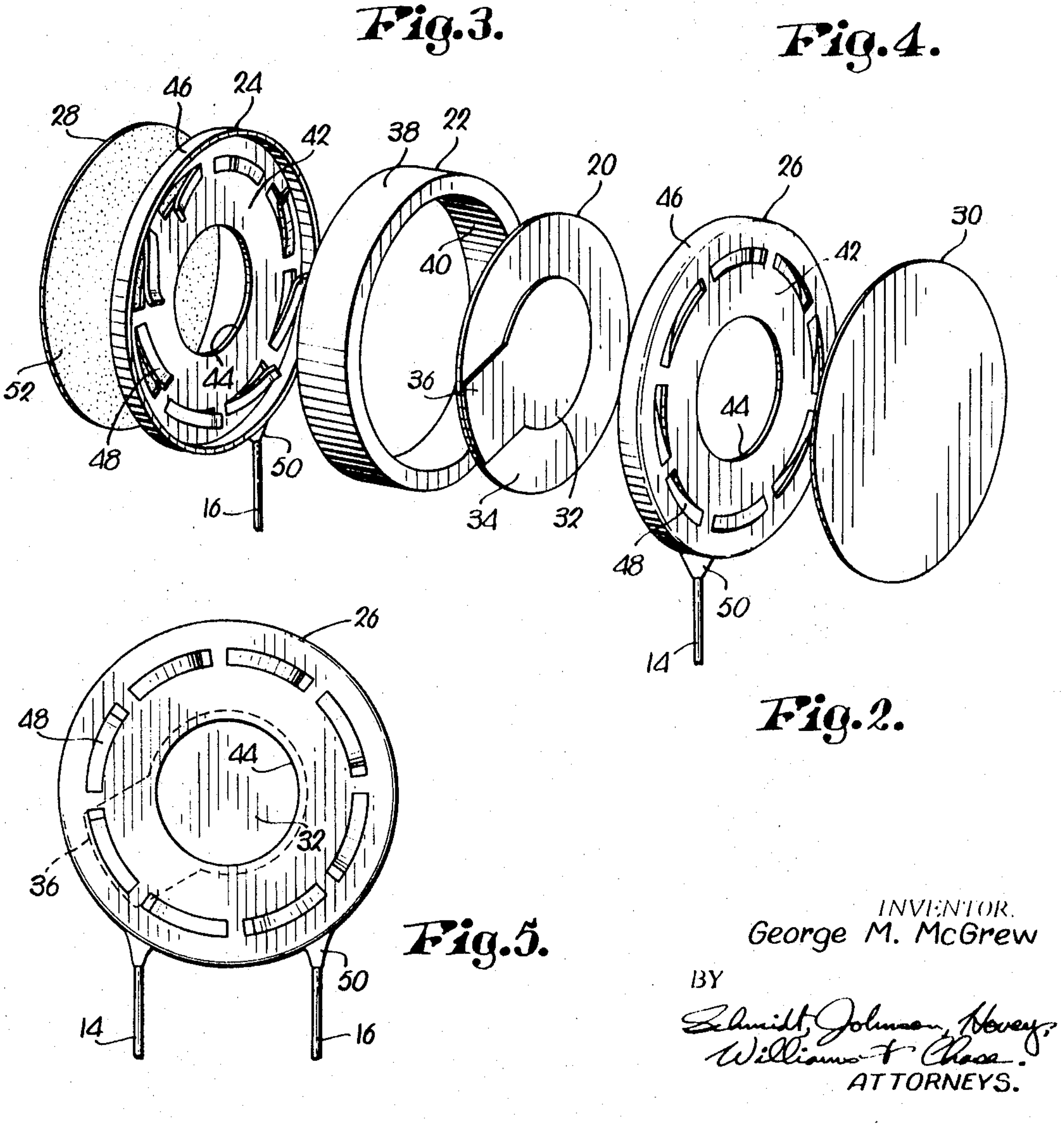
FIG. 2 is an exploded perspective view showing the various structural parts of the assembly, except for the final sealing and protective layer of potting material.
FIG. 5 is a side elevational view of the principal components of the device in assembled condition, but before the application thereto of end coverings and the protective and sealing layer.

Referring now especially to FIG. 2, the assembly generally includes a piezoelectric crystal element 20, an annular frame 22, a pair of caplike end members 24 and 26, and a pair of end covers 28 and 30.

The piezoelectric crystal element 20 is conventionally cut or formed from quartz or other piezoelectric material and may, for example, be typically of a diameter of the order of one-half inch and a thickness of the order of a few one-hundredths of an inch depending upon the frequency characteristics desired. Each of the opposed faces of the element 20 is provided with a generally circular electrode structure 32 of any suitable electrically conductive electrode material affixed to the element 20 in overlying relationship to a central portion of the corresponding face of the element 20. Gold, silver and various alloys may be used for such electrode structures 32, and such thin layers of conductive metal may be affixed to the element 20 by any of various conventional techniques such as plating, sputtering and the like. A generally annular marginal portion 34 of each face of the element 20, which may be beveled or thinner than the central portion of the element 20, lies outside of the electrode structures.

Figure 1:
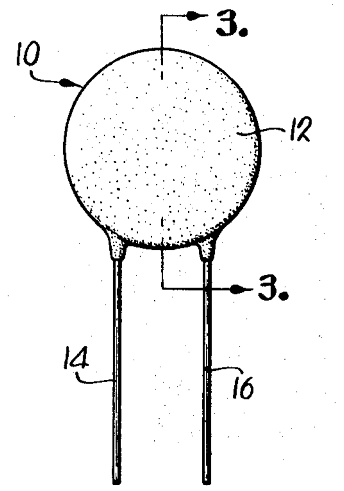
FIG. 1 is a side elevational view of a completed piezoelectric crystal assembly of the type contemplated by this invention.
Figure 3:
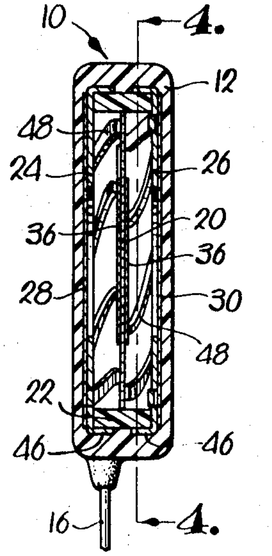
FIG. 3 is a cross-sectional view taken on line 3—3 of FIG. 1.
Figure 4:
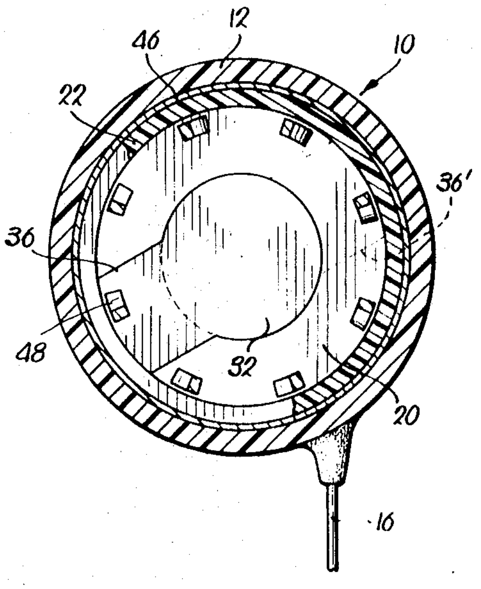
FIG. 4 is a cross-sectional view taken on line 4—4 of FIG. 3.

A contact structure 36 is provided for each electrode structure 32 and extends from the latter in a generally radial direction toward the periphery of the element 20. In the embodiment illustrated, the contact structures 36 and 36+ (see FIG. 4) are shown in the currently conventional configuration as both extending in opposite directions and as extending essentially all the way to the margin of the element 20, as is required by the holding and electrical coupling means now provided in conventional crystal assemblies. It may be noted, however, that neither of such requirements are essential in the contact structures 36 for use in the improved assembly 10 of this invention, thereby eliminating any criticality as to the relative orientation of the contact structures 36 and also permitting a possible saving of expensive electrode material by terminating the contact structures 36 somewhat short of the periphery of the element 20. It should also be observed that the width of the contact structures 36 is normally less than the diameter of the corresponding electrode structure 32, both in order to save expensive electrode material and to avoid undue damping of the piezoelectric characteristics of the element 20, it being sufficient to induce efficient operation of the element 20 for the electrode structures 32 to be coupled only with the central portion of each of the opposed faces of the element 20.

The frame 22 is formed of any suitable electrical insulating material and is provided with an outer peripheral wall 38 and an inner peripheral wall defining an aperture 40 therethrough. As illustrated and as appropriate for use with a crystal element 20 of circular shape, the frame 22 will be annular in form and generally configured as a tubular sleeve of substantially lesser thickness than diameter. However, it should be understood that, if a crystal element 20 of, for example, square shape is to be accommodated, the frame 22 and other structural elements of the combination hereinafter to be described could be similarly configured.

Each of the end members 24 and 26 is provided with an end wall 42 having a central opening 44 therein and a flange 46 extending laterally from the periphery of the end wall 42. The flanges 46 have an internal diameter or dimensions adapted to permit fitting the cuplike members 24 and 26 upon the opposite ends of the sleevelike frame 22 with such flanges 46 in engagement with the outer peripheral wall 38 of the frame 22. The members 24 and 26 are formed of any suitable electrically conductive and resilient metal, for example, brass, beryllium or a suitable alloy having the desired characteristics, to provide an electrically conductive path therethrough as well as shielding for the element 20 when the various parts of the device are assembled. In the latter regard, it is noted that the flanges 46 of the members 24 and 26 are of such widths in relation to the width of the outer wall 38 of the frame 22 that such flanges 46 will not engage each other when the members 24 and 26 are fitted upon the frame 22, thereby maintaining electrical isolation between the members 24 and 26 by virtue of the insulative nature of the frame 22.

Each of the members 24 and 26 is provided with a series of tabs 48 stamped and bent inwardly from the end wall 42 so as to extend from the latter in the same direction as the flange 46. The series of tabs 48 in an assembly 10 for use with a circular crystal element 20 are preferably disposed in annular fashion upon the end wall 42 and spaced intermediately between the flange 46 and the opening 44. The disposition at which the tabs 48 are bent from the plane of end wall 42 presents a plurality of surfaces adjacent the ends of the various tabs 48 which are normally substantially coplanar and adapted, when the members 24 and 26 are fitted upon the frame 22, to extend to a zone closer to the plane of the corresponding tab surfaces on the other of members 24 and 26 than would accommodate the thickness of the outer margin 34 of the element 20 therebetween without some flexing of the resilient tabs 48. It will also be noted that sufficient tabs 48 are provided upon each of the members 24 and 26 so that the mentioned end surfaces of the tabs 48 will be spaced apart a lesser distance than the width of the contact structures 36 on the element 20.

The leads 14 and 16 are physically fastened and electrically connected to the members 26 and 24 respectively in any suitable fashion such as by soldering as at 50. Those skilled in the art will appreciate that, if only very short leads 14 and 16 were required, they might well be suitably formed by the stamping and outward bending of a suitable lead tab from the flange 46 of each of the members 24 and 26.

The assembly of the primary elements 20, 22, 24 and 26 of the device 10 is quite simple and noncritical. One of the members 24 is fitted onto the frame 22 by merely setting or inserting the latter within the flange 46 on the member 24. The element 20 is then merely inserted within the aperture 40 of frame 22, it being noted that the contact structure 36 on the face of the element 20 adjacent the member 24 will be contacted by the end surface portion of one of the tabs 48 regardless of the orientation of the element 20 relative to the frame 22 or the member 24. The other member 26 is then fitted onto the opposite end of the frame 22, whereupon the end surface portion of its tabs 48 will engage the marginal portion 34 of the element 20 oppositely to the engagement of such marginal portion 34 by the tabs 48 on the member 24, and at least one of the tabs 48 on the member 26 will have its end surface portion in electrically contacting relationship with the adjacent contact structure 36. Preferably, the dimensioning of the flanges 46 and the outer wall 38 are such that the members 24 and 26 will remain relatively fixed upon the frame 22 with element 20 being held between the opposed tabs 48 of the members 24 and 26, even when such tabs 48 are slightly flexed from their normal positions to assure positive holding of the element 20 and positive electrical contact with the contact structures 36.

The device 10 is shown in FIG. 5 in elevation as it would appear after assembly of the principal structural elements 20, 22, 24 and 26 in the manner heretofore described. In such condition, the metallic members 24 and 26 are in the same relationship to the element 20 as they will be in the completed device. Accordingly, frequency testing of the operational characteristics of the element 20 may be carried out with the device assembled as shown in FIG. 5. Then, if it is necessary to deposit additional electrode material upon one or both of the electrode structures 32, in order to adjust the frequency characteristics of the element 20, this may be done by various conventional techniques through the openings 44 provided in the end walls 42 of the members 24 and 26, whereupon testing and further deposit may be repeated, if necessary, until the element 20 is adjusted to operate at the desired frequency when disposed in the juxtaposition it will finally occupy in the completed assembly 20 relative to the aforementioned metallic parts of that assembly.

After testing and any required frequency adjustment is completed, the covers 28 and 30 are emplaced upon the members 24 and 26 respectively. The covers 28 and 30 are of shape and dimension adapted to provide a closing cover not only for the opening 44, but also for the holes presented in members 24 and 26 at the places therein from which the tabs 48 are stamped and bent. The covers 28 and 30 will preferably be of an electrically nonconductive material, and it has been found that they may conveniently be formed as discs of paper having a coating of pressure-sensitive adhesive material on one side thereof as at 52, so that the only step required in emplacing the covers 28 and 30 will be to press them onto the outside of the end wall 42 of the corresponding member 24 and 26.

The assembly is then essentially closed with all of the operating parts in their desired positions and the assembly 10 could conceivably be used in this condition. However, it is preferred that the aforementioned parts be encapsulated by a relatively thin enclosing layer 12 to protect the assembly 10 against the effects of moisture. The layer 12 may be formed upon the assembly by conventional techniques, universally known in the trade as "plotting," with any of the accepted low dielectric constant materials widely available in the market and commonly being used to provide a protective encapsulation for various types of electronic components.

It will now be evident that the invention provides a novel and highly advantageous advance over the constructions and techniques previously employed with respect to ease and economy of assembly, lack of criticality of the positioning of the crystal element relative to the other parts of the assembly, adaptability to final frequency adjustments of the crystal element without disassembly of the parts associated therewith for purposes of holding the element and effecting electrical coupling with its electrode structures, and minimization of space or volume requirements of the device as a whole in relation to the size of the crystal element to be accommodated. It should also be noted that the principles of the invention are directly applicable for use in connection with crystal elements of various sizes and shapes through the simple expedient of appropriate modification of the sizes and shapes of the other parts 22, 24, 26, 28 and 30, as will be evident to those skilled in the art.

Accordingly, all such obvious and equivalent modifications and adaptations of the invention are contemplated as within its spirit and substance, and it is intended that the scope of the invention shall be deemed limited only by a fair interpretation of the claims that follow.

Having thus described in the invention, what is claimed as new and desired to be secured by Letters Patent is:

1. A Piezoelectric crystal assembly comprising:

an electrically nonconductive, generally annular frame having an aperture therethrough, presenting a chamber within said frame having an electrically insulated inner periphery and opposite initially open extremities;

a piezoelectric crystal element within said chamber having an outer, generally circular, peripheral edge and a pair of opposite faces bounded by said edge, said element being disposed within said chamber with said edge adjacent said periphery of said frame and said faces respectively facing the corresponding of said extremities of said chamber, each of said faces including a generally, circular, central portion and a generally annular, marginal portion between said central portion and said edge;

an electrically conductive, generally circular, electrode structure for each of said faces respectively each of said electrode structures being adhered to said central portion of the corresponding of said faces;

an electrically conductive, striplike, contact structure for each of said faces respectively, each of said contact structures being mounted upon said marginal portion of the corresponding of said faces, being of lesser width than the diameter of the corresponding of said structures and extending substantially radially from a zone of electrical coupling with the corresponding of said electrode structures toward said edge of said element;

a pair of electrically conductive cap members adapted to be coupled with an external electrical circuit, mounted on said frame in spaced, opposed relationship to each other, with said element being therebetween, and each of said members being disposed adjacent the corresponding of said extremities of said chamber, each of said members being provided with an integral annular flange fitted over a portion of said frame adjacent a corresponding extremity of the latter, at least one of said members having a generally central opening therethrough for introducing and affixing material to said element to adjust the operational characteristics of said element while it remains within said frame with said members mounted on the latter;

resilient, electrically conductive means for each member respectively, each of said last-mentioned means being electrically coupled with the corresponding of said members and extending from the latter toward the other member for holding said element and engaging said contact structures to effect electrical coupling between each contact structure and the corresponding of said members, each of said resilient means comprising a plurality of spaced tabs integral at one extremity thereof with the corresponding of said members and extending at an angle therefrom;

means for closing each said opening after any necessary adjustment of the operational characteristics of said element has been made.

2. The invention of claim 1, wherein said frame, said element, said members, and said resilient means may be assembled with said element in a plurality of different orientations relative to said tabs; and said tabs present surfaces juxtaposed with a plurality of circumferentially spaced parts of said marginal portion of the corresponding of said faces for engagement of each of said contact portions by at least one of said tab surfaces of the corresponding resilient means when said element and said resilient means are in any of said relative orientations.

3. The invention of claim 1, wherein said members are mounted on said frame with said flanges in spaced relationship to each other to provide a substantial peripheral shielding for said element while maintaining said members electrically insulated from each other.

4. The invention of claim 1, wherein said closing means comprises a cover for each such opening having adhesive means thereon for affixing said cover to the corresponding of said members in closing relationship to said openings.

5. The invention of claim 1, wherein is provided an electrically conductive lead secured to each of said members respectively; and the entire assembly, except for a portion of each of said leads, is encapsulated in a layer of potting material to seal the assembly and protect it against moisture.

6. The invention of claim 1, wherein each of said members is provided with a generally central opening; said angular extension of said tabs presents an annular series of outer openings through each of said members; and there is provided cover means for each member respectively for closing both said central and said outer openings thereof.

* * * * *